United States Patent [19]

Shorkey

[11] Patent Number: 5,381,336
[45] Date of Patent: Jan. 10, 1995

[54] SPEED AVERAGING FOR VARIABLE EFFORT POWER STEERING

[75] Inventor: Michael J. Shorkey, Noblesville, Ind.

[73] Assignee: Delco Electronics Corp.

[21] Appl. No.: 161,189

[22] Filed: Dec. 3, 1993

Related U.S. Application Data

[63] Continuation of Ser. No. 704,237, May 22, 1991, abandoned.

[51] Int. Cl.⁶ .......................... B62D 6/02; B62D 5/00
[52] U.S. Cl. .............................. 364/424.05; 180/79.1; 180/143; 180/DIG. 1
[58] Field of Search .................. 364/424.05, 565, 575; 180/141, 142, 79.1, 143, DIG. 1

[56] References Cited

U.S. PATENT DOCUMENTS

| | | | |
|---|---|---|---|
| 4,670,852 | 6/1987 | Masaki et al. | 364/565 |
| 4,674,587 | 6/1987 | Suzuki et al. | 180/142 |
| 4,686,438 | 8/1987 | Ohe et al. | 318/280 |
| 4,886,138 | 12/1989 | Graber et al. | 180/142 |
| 4,991,100 | 2/1991 | Matsui | 364/565 X |
| 5,184,297 | 2/1993 | Graber et al. | 364/424.05 |

Primary Examiner—Kevin J. Teska
Assistant Examiner—Collin W. Park
Attorney, Agent, or Firm—Mark A. Navarre

[57] ABSTRACT

A variable effort power steering unit under control of a microcomputer is able to change steering effort in response to control current. The current is developed as a function of average vehicle speed. In the case of vehicle deceleration, a long averaging time is used to inhibit rapid steering effort changes during braking. In the case of vehicle acceleration, a short averaging time is used for rapid response of steering effort to speed increases.

2 Claims, 2 Drawing Sheets

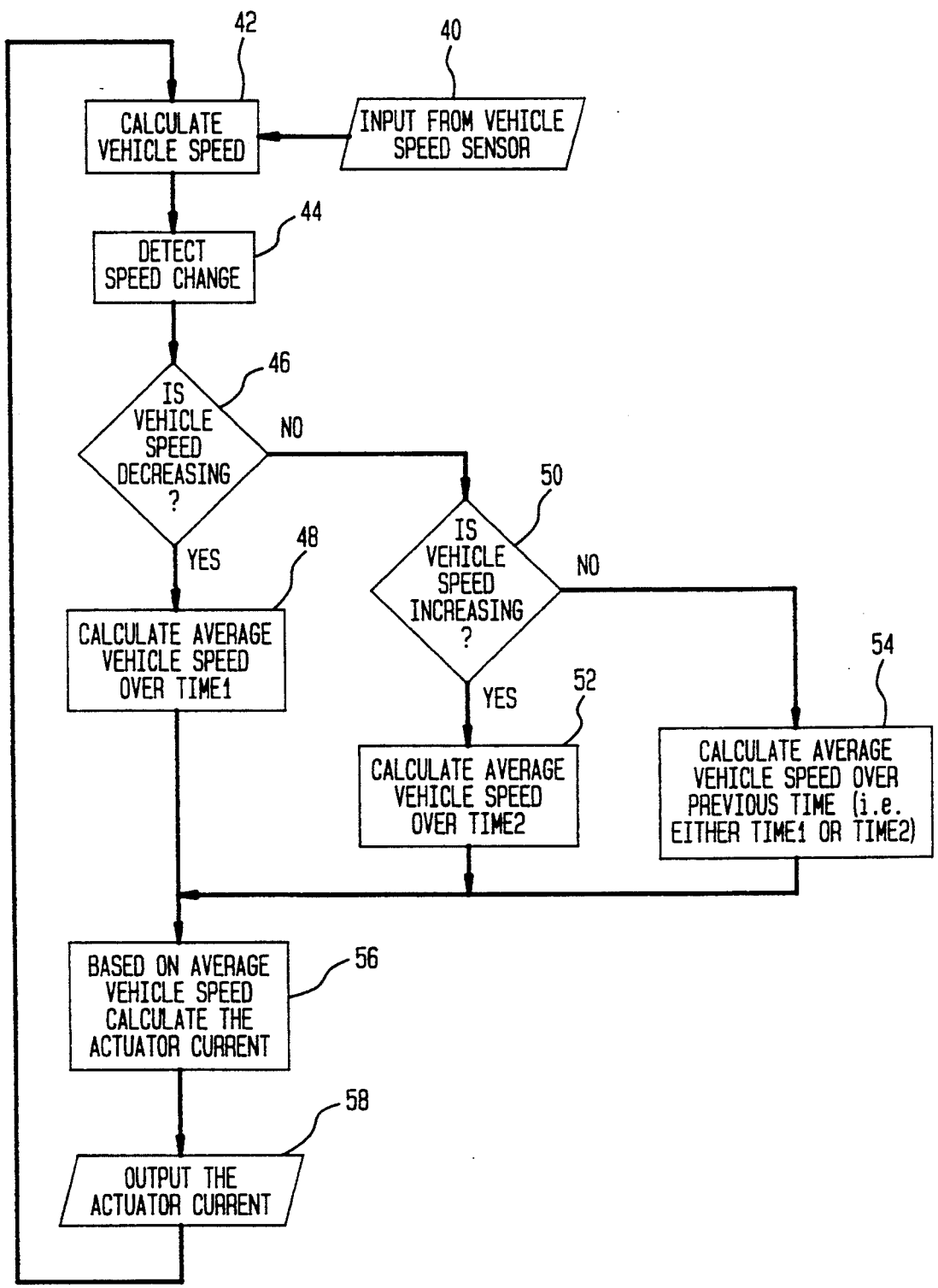

SPEED AVERAGING FOR VARIABLE EFFORT POWER STEERING

This is a continuation of application Ser. No. 07/704,237, filed on May 22, 1991, now abandoned.

FIELD OF THE INVENTION

This invention relates to power steering, and more particularly, to controlling the steering effort as a function of average vehicle speed.

BACKGROUND OF THE INVENTION

The conventional hydraulic power assist steering system comprises a hydraulic actuator for moving the steering linkage in relation to the fluid flow supplied thereto, and a rotary hydraulic control valve assembly for controlling fluid flow to the actuator in relation to the operator exerted steering torque. The control valve generally includes a cylindrical valve body rotatable within the valve housing and a spool rotatably disposed within the valve body. Hydraulic fluid is supplied to a cavity formed in the spool, and the valve body is grooved to receive fluid flow in relation to the amount of relative rotation between spool and valve body. The fluid so received is then directed to the actuator so that steering assist is developed in relation to the relative rotation of the valve body and spool.

The spool is manually rotated by the operator of the vehicle and is connected to mechanically drive the steering linkage through a lost motion coupling. A resilient element, such as a torsion bar, couples the spool and valve body to provide a centering force for aligning the spool and valve body, and to permit relative rotation therebetween in relation to operator exerted steering torque, at least within the limitations of the lost motion coupling.

In systems of the type described above, the level of driver steering effort required to produce a given level of power assist depends primarily on the compliance of the torsion bar. If the torsion bar has relatively high compliance, a relatively low level of driver steering effort is required. This is generally desirable in low speed operation of a vehicle where relatively high steering forces are required. If the torsion bar has relatively low compliance, a relatively high level of driver steering effort is required. This is generally desirable in high speed operation of a vehicle where relatively low steering forces are required.

The need to accommodate different steering levels at different speeds has been met by U.S. Pat. No. 4,886,138 issued Dec. 12, 1989, to Graber et al. entitled "Electromagnetic Control Apparatus for Varying the Driver Steering Effort of a Hydraulic Power Steering System". This patent describes a hydraulic power assist steering system having conventional relatively rotatable spool and valve body elements for flow regulation, and an integral electromagnetic mechanism operating in conjunction with the torsion bar to define a coupling of variable resilience between the spool and valve body for adjusting driver steering effort required to produce a given level of power assist. The current to the electromagnetic mechanism determines the steering effort and the current is varied as a function of vehicle speed.

In the event that the vehicle speed changes rapidly, the steering effort may also change rapidly. In some cases, such as during vehicle acceleration, this is desirable since the better road feel becomes available when needed. On the other hand, steering effort may decrease rapidly during deceleration. It is preferred, however, that the current be controlled to enhance drivability and not cause sudden decrease in steering effort.

SUMMARY OF THE INVENTION

It is therefore an object of this invention to limit the rate of change in steering effort in response to vehicle speed, especially during deceleration.

It is a further object to provide a different steering response to speed for acceleration and deceleration.

The invention is carried out in a variable effort power steering system responsive to a steering effort control current, and having a controller for varying control current as a function of vehicle speed by the method of calculating vehicle speed comprising: providing a vehicle speed input signal; periodically calculating vehicle speed samples from the speed input signal; detecting a change in vehicle speed; calculating an average speed; and generating a steering effort control signal as a function of the calculated average speed; wherein when speed decrease is detected, the step of calculating the average speed comprises averaging the calculated speed samples over a given time period.

The above and other advantages of the invention will become more apparent from the following description taken in conjunction with the accompanying drawings.

BRIEF DESCRIPTION OF THE DRAWINGS

FIG. 4 is a flow chart illustrating the program steps for carrying out the invention.

DESCRIPTION OF THE INVENTION

The ensuing description is directed to a particular steering system with electromagnetic variable resilience coupling and a speed responsive current control for that system. However, the invention is not limited to use with that mechanism. The speed responsive control applies as well to other variable effort power steering systems which respond to an electrical speed signal. One such alternative system utilizes a variable orifice in the power steering hydraulic system to change the steering effort, and the orifice is electrically controlled as a function of vehicle speed.

Figure 1:
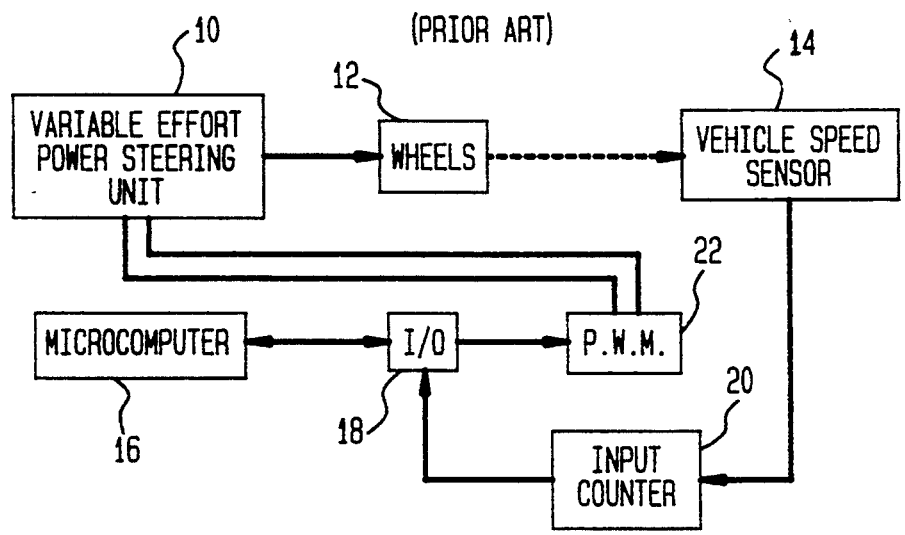
FIG. 1 is a block diagram of a variable effort power steering system for carrying out the method of the invention.

FIG. 1 shows a system and a variable effort power steering unit 10 which are further described in detail in the above U.S. Pat. No. 4,886,138 to Graber et al. The steering unit 10 determines the steering position of the wheels 12. The speed of the wheels is sensed by a speed sensor 14 and the signal therefrom is used as a measure of vehicle speed. A computer based control unit is supplied with operating power from the vehicle storage battery (not shown), and comprises a microcomputer 16, an input/output device (I/O) 18, an input counter 20, and a pulse-width-modulation driver (PWM) 22, all of which may be conventional devices. The microcomputer 16 communicates with the remainder of the system via the I/O device 18; in response to various input information, microcomputer 16 executes a series of program instructions for developing an output command pertaining to the required energization of the unit 10.

The primary control unit input is an oscillatory speed signal from the sensor 14. The speed signal is applied to the I/O device 18 through the input counter 20, which divides the frequency of the speed signal by a predetermined factor. The PWM command for exciting the unit 10 is applied to a bidirectional PWM driver 22 for correspondingly modulating the unit 10 with control current from the vehicle storage battery.

Figure 2:
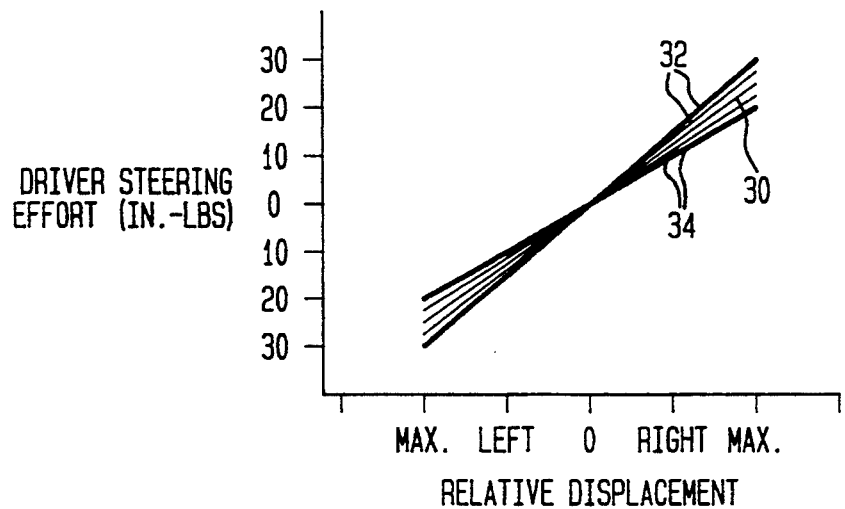
FIG. 2 depicts the variation in driver steering effort achieved by the system of FIG. 1.

According to the embodiment described in the Graber et al. patent, the relative displacement of a valve spool and a valve body is resisted by a torsion bar and a magnetic centering force, and the magnetic force is dependent on actuator or control current supplied to the steering unit 10. For a zero control current, the combined effect of the torsion bar and the magnetic centering force in the power steering unit 10 produces an intermediate level of steering assist, represented by the trace 30 in FIG. 2. This level of assist is most suitable for an intermediate vehicle speed such as 30 miles per hour. Current of one polarity increases the driver steering effort per unit relative displacement of the valve spool and body, with more current requiring greater effort, as indicated by the traces 32. This is generally suitable for higher speeds. Current of the opposite polarity decreases the driver steering effort, as indicated by traces 34, and is desirable at lower speeds. Thus variable effort is effected by varying the control current.

Figure 3:
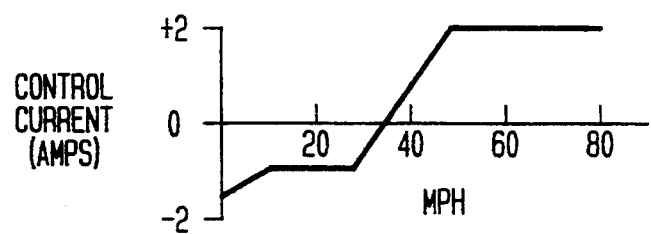
FIG. 3 is a graph of current versus effective vehicle speed.

While the actuating or control current may be generated as a linear function of speed, it may also be tailored to optimize the benefit of the steering effort adjustability. FIG. 3 shows one example of how the current may vary with speed. Maximum current of one polarity occurs at zero vehicle speed to give maximum steering assist. The current decreases gradually between 0 and 10 mph and remains constant up to about 30 mph to continue a greater level of assist than is available with no current. Then between 30 mph and 50 mph, the current changes linearly to the maximum value of the other polarity occurring at speeds of 50 mph and higher where the most steering effort is required and the best road feel is attained. A zero crossing of the current occurs just below 40 mph where the effort represented by trace 30 in FIG. 2 prevails. Thus, it is apparent that the steering effort changes during acceleration or deceleration, especially in certain speed ranges. Of course if the current were a linear function of speed, the steering effort would change during speed changes at all speeds.

To determine the vehicle speed to be used in calculating the actuating current, the vehicle speed signals are sampled periodically to calculate speed samples. These speed samples can be used directly in the current calculations, but a moving average can be advantageously used for preventing sudden changes in the control current and the steering effort. It is particularly helpful to retard the steering effort change during vehicle deceleration. Thus, the speed samples can be averaged in different ways or over different time periods according to the type of speed change, if any.

The flow chart of FIG. 4 illustrates the method used within the microcomputer 16 to derive actuator current as a function of speed. The numbers nn in angle brackets <nn> refer to the reference numerals in the chart, and are used to describe the functions of each block. The input from the vehicle speed sensor <40> is used to calculate vehicle speed <42>. A new speed sample is calculated for each control loop of the microcomputer to produce a speed sample, say, every 40 msec. Consecutive speed samples are compared to detect a change of speed <44>.

If the vehicle speed is decreasing <46>, the average speed is calculated over a first time period such as three seconds <48>. If the vehicle speed is increasing <50>, the average speed is calculated over a second time period <52> which is preferably shorter than the first time period. The second time period may even equal the sampling period of 40 msec so that, in effect, the last speed sample is adopted as the "average speed". If the vehicle speed is neither decreasing <46> nor increasing <50>, the previous time period is invoked as the averaging period for calculating the average speed <54>. For example, if the last speed change was decreasing, the first time period is used and will continue to be used until a speed increase is detected. Then, the actuator current is calculated based on the calculated average speed <56>, the actuator current is output <58> to the power steering unit 10 via the PWM driver 22, and the loop is repeated.

It will thus be seen that the current control according to this invention is able to independently manage speed averaging under acceleration and deceleration conditions by utilizing different averaging periods for each case, thereby changing the amount of steering assist less rapidly for deceleration then for acceleration.

The embodiments of the invention in which an exclusive property or privilege is claimed are defined as follows:

1. In a variable effort steering system having a steering effort controlled to increase in predetermined relation to vehicle speed, a method of control, comprising the steps of:

periodically sampling instantaneous vehicle speed values;

controlling the steering effort in accordance with a first average vehicle speed signal when successively sampled instantaneous vehicle speed values indicate increasing vehicle speed with respect to time, said first average speed signal being an average of the instantaneous speed values sampled over a first time period; and controlling the steering effort in accordance with a second average vehicle speed signal when successively sampled instantaneous vehicle speed values indicate decreasing vehicle speed with respect to time, said second average speed signal being an average of the instantaneous speed values sampled over a second time period which is longer than said first time period, so as to include more instantaneous vehicle speed values than said first time period, and so that the rate of change in steering effort for a given rate of change in vehicle speed is lower during decreasing vehicle speed than during increasing vehicle speed.

2. A method of control as set forth in claim 1, including the step of:

detecting a condition of decreasing vehicle speed with respect to time, and in response to such detection, controlling the steering effort in accordance with said second average speed signal until successively sampled instantaneous vehicle speed values indicate increasing vehicle speed.

* * * * *